US009868654B2

(12) United States Patent
Vinson et al.

(10) Patent No.: US 9,868,654 B2
(45) Date of Patent: Jan. 16, 2018

(54) FRESH-WATER CLARIFICATION SYSTEM WITH ACCELERATOR

(71) Applicants: Ira Vinson, Kemah, TX (US); Gus Gavrel, Kemah, TX (US)

(72) Inventors: Ira Vinson, Kemah, TX (US); Gus Gavrel, Kemah, TX (US)

(73) Assignee: The Vinson/Gavrel Group, Kemah, TX (US)

( * ) Notice: Subject to any disclaimer, the term of this patent is extended or adjusted under 35 U.S.C. 154(b) by 357 days.

(21) Appl. No.: 14/722,497

(22) Filed: May 27, 2015

(65) Prior Publication Data

US 2015/0344331 A1 Dec. 3, 2015

Related U.S. Application Data

(60) Provisional application No. 62/003,277, filed on May 27, 2014.

(51) Int. Cl.
| | |
|---|---|
| *C02F 1/463* | (2006.01) |
| *B01F 3/08* | (2006.01) |
| *B01F 5/04* | (2006.01) |
| *B01F 5/10* | (2006.01) |
| *C02F 1/52* | (2006.01) |
| *C02F 103/00* | (2006.01) |

(52) U.S. Cl.
CPC ............ *C02F 1/463* (2013.01); *B01F 3/0865* (2013.01); *B01F 5/043* (2013.01); *B01F 5/106* (2013.01); *C02F 1/5281* (2013.01); *C02F 2103/007* (2013.01); *C02F 2201/009* (2013.01); *Y02W 10/37* (2015.05)

(58) Field of Classification Search
CPC . C02F 1/463; C02F 1/52–1/529; B01F 5/043; B01F 5/106
See application file for complete search history.

(56) References Cited

U.S. PATENT DOCUMENTS

| | | | |
|---|---|---|---|
| 2004/0140218 A1* | 7/2004 | Gavrel | B01D 21/0009 204/660 |
| 2009/0127210 A1* | 5/2009 | Swisher | C02F 1/50 210/764 |

* cited by examiner

*Primary Examiner* — Bryan D. Ripa
*Assistant Examiner* — Ho-Sung Chung
(74) *Attorney, Agent, or Firm* — Law Office of Tim Cook P.C.

(57) ABSTRACT

A method and apparatus for the shearing and dispersion of an active flocculent that is discharged from an electrolytic reactor into a larger volume or flow of water are disclosed. The device is submerged in a natural body of water, tank, etc. and is connected to the reactor via a fluid conduit such that the effluent is discharged under pressure through the device into the body of water. The accelerator device uses available pressure to shear the active flocculent into smaller size particles by impingement and to mix the reactor discharge into a larger volume or flow of water by entrainment. The apparatus uses the available pressure present in the reactor discharge and therefore is recovering waste energy from the available hydraulic power for operation. The submerged accelerator device may also include charged electrode plates to provide additional treatment and/or a motor driven turbine pump to allow the device to operate detached from the reactor as a stand-alone, submersible system that may be operated via alternative energy sources including solar, wind and hydro power. An in-line device is also described.

5 Claims, 2 Drawing Sheets

FRESH-WATER CLARIFICATION SYSTEM WITH ACCELERATOR

FIELD OF THE INVENTION

The present invention relates generally to the field of water clarification systems, and, more particularly, to a system arranged to clarify the water in a large, fresh water body of water such as a lake.

BACKGROUND OF THE INVENTION

Cooling ponds associated with electrical power plants build up turbidity which can eliminate marine life. Thus, there remains a need for a reliable, robust, yet cost effect means to clarify the water in such a cooling pond, thereby restoring the marine life to the pond.

SUMMARY OF THE INVENTION

The present invention builds on the teachings of the method and apparatus discussed in our prior U.S. Pat. No. 6,719,894 B2 (2004) entitled "Process for Electrocoagulating Waste Fluids" and U.S. Pat. No. 7,087,176 B2 (2006) entitled "High Pressure Method and Apparatus for the Electrocoagulative Treatment of Aqueous and Viscous Fluids."

The system herein described includes a submersible apparatus and method for the shearing and dispersion of an active flocculent discharged from the elecrocoagulative reactor of the '894 and '176 patents into a large volume of water. The system recovers waste energy and provides a means for the in-situ treatment of large bodies of water. The system may also be applied in facilities for treatment of water in tanks and ponds or in-line using the existing pressure from pumping systems. An alternate design uses an integral, motor driven pump allowing the apparatus to also be used as a stand-alone, submersible system that can be operated by alternative power sources including but not limited to solar, wind and multiple hydro-turbine power generating systems.

Our prior U.S. Pat. No. 6,719,894 B2 (2004) and No. 7,087,176 B2 (2006) discuss the generation of active flocculent (Iron, Aluminum, etc.) within the electrolytic reactor and the multiple mechanisms by which treatment occurs. These disclosures teach that the treated discharge exits from the reactor under pressure and the pressure is released through a liquid/solids separation device including variable size membranes (micro, ultra, nano), two and three phase centrifuges and dissolved gas (air) flotation clarifiers. Liquid/solids separation can also be accomplished via gravity sedimentation using typical clarifiers that are familiar to those skilled in the art. All of these applications (except membrane) focus on contact with and agglomeration of the active flocculent to form larger structures that are more easily removed by the aforementioned, liquid/solids separation methodologies. For the in-situ treatment of large bodies of water, this does not apply simply because of the extreme volumes of water and high flow rates involved.

Thus, our focus in the current disclosure is directed to the dispersion of the active flocculent into the largest volume of water possible so as to cause the charge neutralization of colloidal particulates and co-precipitation of contaminate species. Bacteria, algae, viruses and certain organics are destroyed by the EMF present when passing through the electrolytic reactor and an accelerator device.

The accelerator apparatus is constructed as two concentric, elongate conduits or tubes open on both ends with the smaller diameter, centrally located conduit being used as a drive water tube, and the larger, outer conduit being a pump tube. The drive water tube is supported centrally within the pump tube and is connected to the drive water inlet of the device via a bulk head fitting/flanged connection on the sidewall of the outer pump tube. The water containing the active flocculent that is discharged from the reactor enters through this connection, is diverted down the centrally located drive water tube and discharged within the outer pump tube toward the discharge/effluent end of the device. This provides the driving force and energy to operate the system.

The accelerator apparatus is mounted above a stand or suspended below a fixed or floating structure such that it may be submerged below the water surface. It is connected to the effluent connection on the electrolytic reactor via hose, pipe or other fluid conduit such that the effluent containing the active flocculent is discharged from the reactor, through the interconnecting fluid conduit, to the inlet of the accelerator apparatus. The water is then discharged from the apparatus into the body of water and as such the pressure within the Reactor is released through the device. As the reactor effluent containing the active flocculent enters the accelerator apparatus, the direction of flow is changed twice as it is redirected within the centrally located drive water tube of the apparatus. Each time the flow direction is changed, the active flocculent is sheared into smaller particles by impingement against the striking surfaces. Smaller particle size relates directly to a substantial increase in the surface area of the active flocculent for the adhesion and co-precipitation of contaminates.

The accelerator apparatus is designed with a drive water tube centrally located within the outer pump tube. As the influent water containing the active flocculent travels through the drive water tube at a higher velocity toward the effluent/discharge end of the apparatus, it creates an area of low energy/low pressure in accordance with Bernoulli's Principal. Water from the outside environment will be forced into this area of low energy as the system attempts to reach equilibrium. This phenomenon is known as "entrainment" and the suction end of the drive water tube is called Inlet 1. Because the centrally located drive water tube discharges inside of the outer pump tube, the water flow flairs out filling the larger volume of the outer pump tube therefore increase the velocity, creating a second area of low energy/low pressure within the outer pump tube. This results in second area in the annular space between the drive and pump tubes for the entrainment of additional water from the outside environment. This is Inlet 2.

As the drive water to the drive water tube is supplied continuously under pressure through the reactor, the area of low pressure at the rear of the central drive water tube (Inlet 1) and the outer pump tube (Inlet 2) draw in or entrain additional flows of water from the surrounding environment. The system can therefore entrain a flow approximately twenty times the flow rate of the drive water at the expense of the available pressure, and as such is recovering waste energy from the residual hydraulic power generated at the feed pump to the reactor. As the drive water and entrained water flow through the apparatus, the two flows are intermingled and mixed vigorously in both tubes before discharge to the environment. Water is discharged in a laminar flow that will not disturb sediments in the surrounding environment.

The apparatus may also include an integral electrode plate pack within the submersible apparatus located at the discharge end of the inner drive water tube such that the higher flow/higher pressure discharge from the drive water tube is directed through the spaces between the energized electrode plates and therefore provides additional treatment for the higher flow of entrained water.

In another embodiment of the system, a high speed, low torque, DC electric motor rotates two turbines or a jet drive located within the central drive water tube to generate the water flow through the device. Combination with the correct electrode plate pack provides a stand-alone, submersible unit that can be powered by alternative power sources including solar, wind and hydro generators.

Another embodiment of the invention incorporates a circular branch pipe that is fabricated such that the outer diameter of the pump tube can fit within the diameter of the structure. The branch pipe is mounted at the suction end of the pump tube perpendicular to the elongated length. The branch pipe may be fabricated in three or four arced sections with flanged connections that form a circular structure when bolted together. Each arced section of the main conduit contains a smaller diameter pipe that branches off from the main conduit such that it intersects and penetrates through the sidewall of the pump tube at a 45° angle. These branches supply the drive water to the drive water tube or the pump tube if no central drive water tube is used. The flow is delivered under pressure through the multiple branches such that the individual three or four branched flows impinge on each other at an angle (45°) at the center of the drive water/pump tubes shearing the active flocculent and creating the driving force for the entrainment of water.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
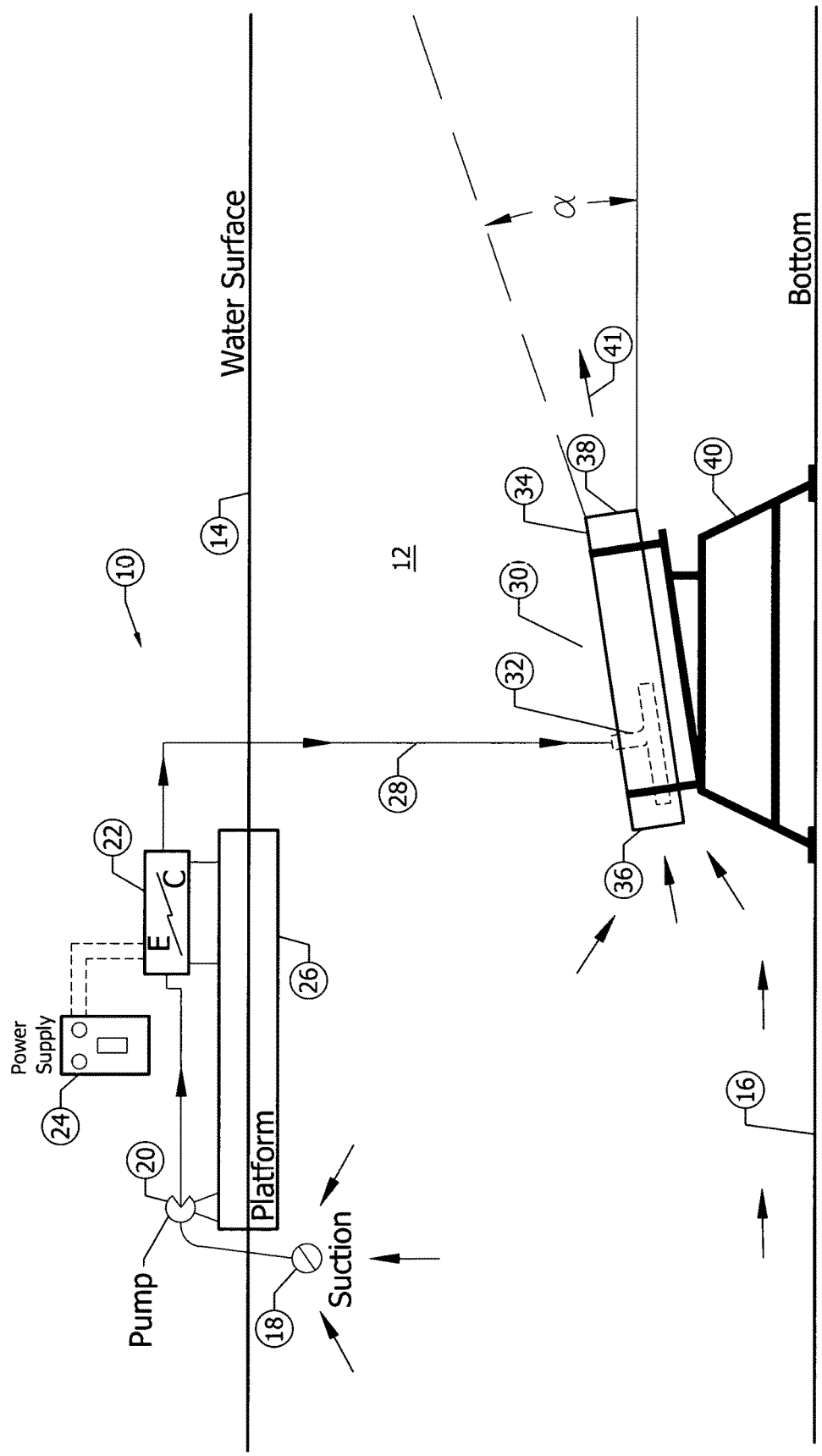
FIG. 1 is an overall schematic drawing of a fresh water clarification system in accordance with this invention.

FIG. 1 shows a clarification system 10 of this invention. The system is deployed into a body of water 12 of which the surface 14 and the bottom 16 are shown. A coarse filtered inlet 18 draws in water into a suction of a pump 20. The pump forces water into an electrolytic reactor 22, which is powered by a power supply 24. The pump 20, reactor 22, and power supply 24 are preferably mounted on a platform 26 that floats on the surface 14. The reactor 22 discharges flocculent into a supply line 28 which feeds into an accelerator 30. The accelerator 30 includes a drive water tube 32, and a larger, outer pump tube 34. The drive water tube draws water from the body of water 12 into an inlet 36 of the pump tube 34 and discharges that water, with entrained flocculent, out a discharge 38. The accelerator 30 is preferably mounted above the bottom 16 on a pedestal 40. Further, the accelerator 30 defines an axis 41 which is oriented at an angle a in relation to the bottom 16.

Figure 2:
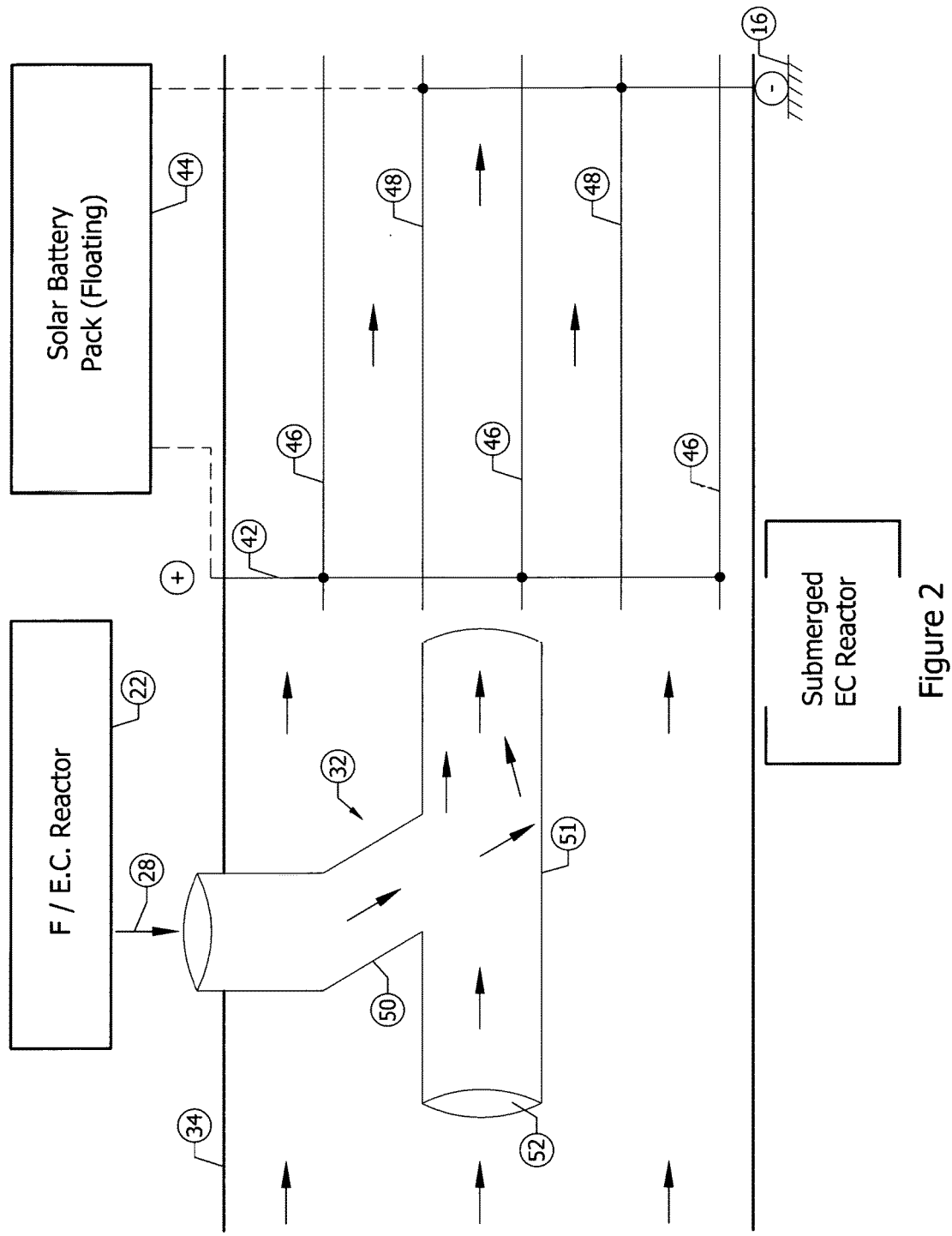
FIG. 2 is a detail side view of an accelerator mounted within an outer tube to direct flocculent out into a flow of water to be clarified and discharged into the source of the water.

FIG. 2 shows detail of the inner drive tube 32 mounted with the outer pump tube 34. The accelerator may also include an integral electrode plate pack 42 powered by a solar battery pack 44 or other power means. The electrode plate pack 42 includes a plurality of positive plates 46 and a plurality of negative plates 48 and the negative plates 48 are preferably grounded to the bottom 16.

Water from the reactor 22 with entrained flocculent is supplied to the inner drive tube 32 into an angled junction tube 50. The drive tube 32 generally comprises the junction tube 50 and an axial tube 51. Forward motion of the water in the junction 50 draws water from the body of water 12, including silt and other suspended particulate matter requiring removal to clarify the water, into an inlet 52 of the inner drive tube 32. The water is then directed through an electrode plate pack 42, which enhances the clarification process. The clarified water is then directed back into the water 12 at the angle α.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A water clarification system comprising:
   a. a water pump having an inlet and an outlet;
   b. a suction to draw water from a body of water to be clarified into the inlet of the water pump;
   c. an electrolytic reactor coupled to the outlet of the pump, the reactor having an outlet, the reactor arranged to add flocculent to the water from the pump;
   d. an accelerator coupled to the outlet of the reactor, the accelerator arranged to draw water from a body of water to be clarified, to expose the water through the accelerator to the flocculent from the reactor to develop treated water, and to discharge the treated water into the body of water to be clarified;
   wherein the accelerator comprises: an outer pump tube; and a drive water tube mounted within the outer pump tube,
   wherein the drive water tube comprises a junction tube and an axial tube, and wherein the junction tube is joined to the axial tube at an angle, and
   wherein the axial tube defines a discharge and further comprising an electrode plate pack at the discharge of the axial tube.

2. The system of claim 1, further comprising a bottom platform configured to support the accelerator above the bottom of a body of water.

3. The system of claim 2, wherein the accelerator defines an axis and the bottom platform supports the accelerator wherein the axis is directed at a non-zero angle relative to the bottom of the body of water.

4. The system of claim 1, further comprising a floating platform configured to support the water pump, suction, and electrolytic reactor on the surface of a body of water.

5. The system of claim 1, further comprising a supply line coupling the outlet of the reactor to the drive water tube.

* * * * *